United States Patent
Herron et al.

(10) Patent No.: US 7,431,557 B2
(45) Date of Patent: Oct. 7, 2008

(54) COMPENSATING FOR BLADE TIP CLEARANCE DETERIORATION IN ACTIVE CLEARANCE CONTROL

(75) Inventors: William Lee Herron, Cincinnati, OH (US); Matthew William Wiseman, Fairfield, OH (US); Jon Michael Vishnauski, Loveland, OH (US); Brian Edward Krupp, Liberty Township, OH (US); Ronald George Maruscik, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 11/441,258

(22) Filed: May 25, 2006

(65) Prior Publication Data

US 2007/0276578 A1 Nov. 29, 2007

(51) Int. Cl.
G06F 19/00 (2006.01)
(52) U.S. Cl. .......................... 415/1; 415/127
(58) Field of Classification Search .............. 415/1, 415/9, 14, 126, 127, 175; 60/39.281, 238
See application file for complete search history.

(56) References Cited

U.S. PATENT DOCUMENTS

| 4,304,093 A | 12/1981 | Schulze |
| 4,856,272 A | 8/1989 | Putman et al. |
| 4,928,240 A | 5/1990 | Davison et al. |
| 5,012,420 A | 4/1991 | Walker et al. |
| 5,081,830 A | 1/1992 | Schwarz et al. |
| 5,197,280 A * | 3/1993 | Carpenter et al. ............. 60/204 |
| 6,463,380 B1 | 10/2002 | Ablett et al. |
| 2005/0017876 A1 | 1/2005 | Ziarno |
| 2005/0149274 A1 | 7/2005 | Finnigan et al. |
| 2007/0214795 A1* | 9/2007 | Cooker et al. ................ 60/772 |

* cited by examiner

*Primary Examiner*—Igor Kershteyn
(74) *Attorney, Agent, or Firm*—William Scott Andes; Steven J. Rosen

(57) ABSTRACT

A method to compensate for blade tip clearance deterioration between rotating blade tips and a surrounding shroud in an aircraft gas turbine engine includes determining one or more variables based on at least one or more moving averages of one or more engine operating parameters respectively averaged over a fixed number of operational engine flight cycles and adjusting a flow rate of thermal control air to counter the blade tip clearance deterioration based on the one or more variables. The engine operating parameters may include running number of engine cycles, takeoff and cruise exhaust gas temperature margins, a cruise turbine efficiency, takeoff and cruise maximum turbine speeds, a cruise fuel flow. Some or all of the variables may be differences between the moving averages and corresponding baselines of the engine operating parameters respectively or the variables may all be moving averages. The flow rate may be adjusted incrementally.

18 Claims, 7 Drawing Sheets

US 7,431,557 B2

COMPENSATING FOR BLADE TIP CLEARANCE DETERIORATION IN ACTIVE CLEARANCE CONTROL

BACKGROUND OF THE INVENTION

Field of the Invention

This invention relates to methods for compensating for deterioration of turbine blade tip clearances in a gas turbine engines.

Engine performance parameters such as thrust, specific fuel consumption (SFC), and exhaust gas temperature (EGT) margin are strongly dependent upon clearances between turbine blade tips and static seals or shrouds surrounding the blade tips. Over the duration of the engine's life, these clearances tend to increase as a result of blade rubs, oxidation, and erosion, thus, causing a deterioration in engine performance. It is highly desirable to compensate for this deterioration.

It is well known that a major factor in deterioration of engine efficiency and increasing specific fuel consumption of an aircraft gas turbine engines is the gradual increase in the clearance between the turbine blade tips and surrounding static seals or shrouds. Deterioration of the tip clearances increases the amount of leakage of working fluid of the turbine across individual rotor stages in the turbine as well as compressor stages of the gas turbine engine. Such leakage reduces overall engine efficiency hence raising the total specific fuel consumption.

This increase is directly related to the accumulated usage of an engine since the engine was first placed into service or after engine maintenance was performed to return the tip clearances at or near to original specifications. This typically involves replacement or refurbishment of the seal and/or blade tips, a time consuming and expensive procedure. The blade tip clearances are at a minimum and sealing effectiveness is at a maximum immediately following installation. The blade tip clearances and sealing effectiveness deteriorate as the engine is operated over an ever increasing number of cycles.

One method of improving both the wear life and effectiveness of blade tip seals is "active clearance control". Active clearance control modulates a flow of cool air from the engine fan and/or compressor which is sprayed on a high pressure turbine casing to shrink the casing relative to the high pressure turbine blade tips under certain operating conditions, i.e. steady state, high altitude cruise conditions. The cooling air may be flowed to or sprayed on other static structure used to support the shrouds or seals around the blade tips. The modulated flow of cooling air is used at preselected engine operating conditions and is designed to allow the engine to operate with minimum seal clearance for the majority of its operating cycle while reducing or eliminating the interference or abrasion between the seal and blade tips which can occur during transient conditions such as takeoff, throttle back, etc.

Engines equipped with active clearance control are still subject to accumulated engine usage related blade tip clearance deterioration. It is known to attempt to measure the operating blade tip clearances and modify the clearances by either mechanical or thermal means. It is also known to periodically restoring the blade tip clearance by incrementally increasing the flow of external cooling air responsive only to an accumulated engine use parameter. Such a method is disclosed in U.S. Pat. No. 4,856,272. This method establishes an incremental change in the engine's active clearance control system at a predetermined engine usage interval between scheduled overhauls. The increment and usage interval are predetermined from prior experience with a plurality of similarly configured engines, allowing the adjustment to a particular engine to be made based solely on the accumulated hours or cycles of engine operation.

It is highly desirable to be able to maintain or restore as much as possible optimum blade tip clearance in an aircraft gas turbine engine between seal and/or blade tip replacement or refurbishment. It is also highly desirable to accurately and automatically compensate for the deterioration in engine performance due to increase blade tip clearance due to wear.

SUMMARY OF THE INVENTION

A method to compensate for blade tip clearance deterioration between rotating blade tips and a surrounding shroud in an aircraft gas turbine engine includes determining one or more variables based on at least one or more moving averages of one or more engine operating parameters, respectively, averaged over a fixed number of operational engine flight cycles, calculating a blade tip clearance deterioration based on the variables, and adjusting flow rate of thermal control air to counter the blade tip clearance deterioration based on the one or more variables. The engine operating parameters may be chosen from a group including running number of engine cycles, takeoff and cruise exhaust gas temperatures, a cruise turbine efficiency, takeoff and cruise maximum turbine speeds, and a cruise fuel flow.

The method may further include determining an amount of blade tip closure to counter the blade tip clearance deterioration and adjusting the flow rate of thermal control air when the amount meets incremental criteria for adjusting the flow rate of thermal control air. The variables may include differences between the moving averages and corresponding baselines of the engine operating parameters. The method may further include determining percentages of the variables that are due to a radial blade tip clearance between the blade tips and the shroud from percentage functions relating the percentages to the variables and then determining the component deteriorations from component deterioration functions relating the component deteriorations to the percentages.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
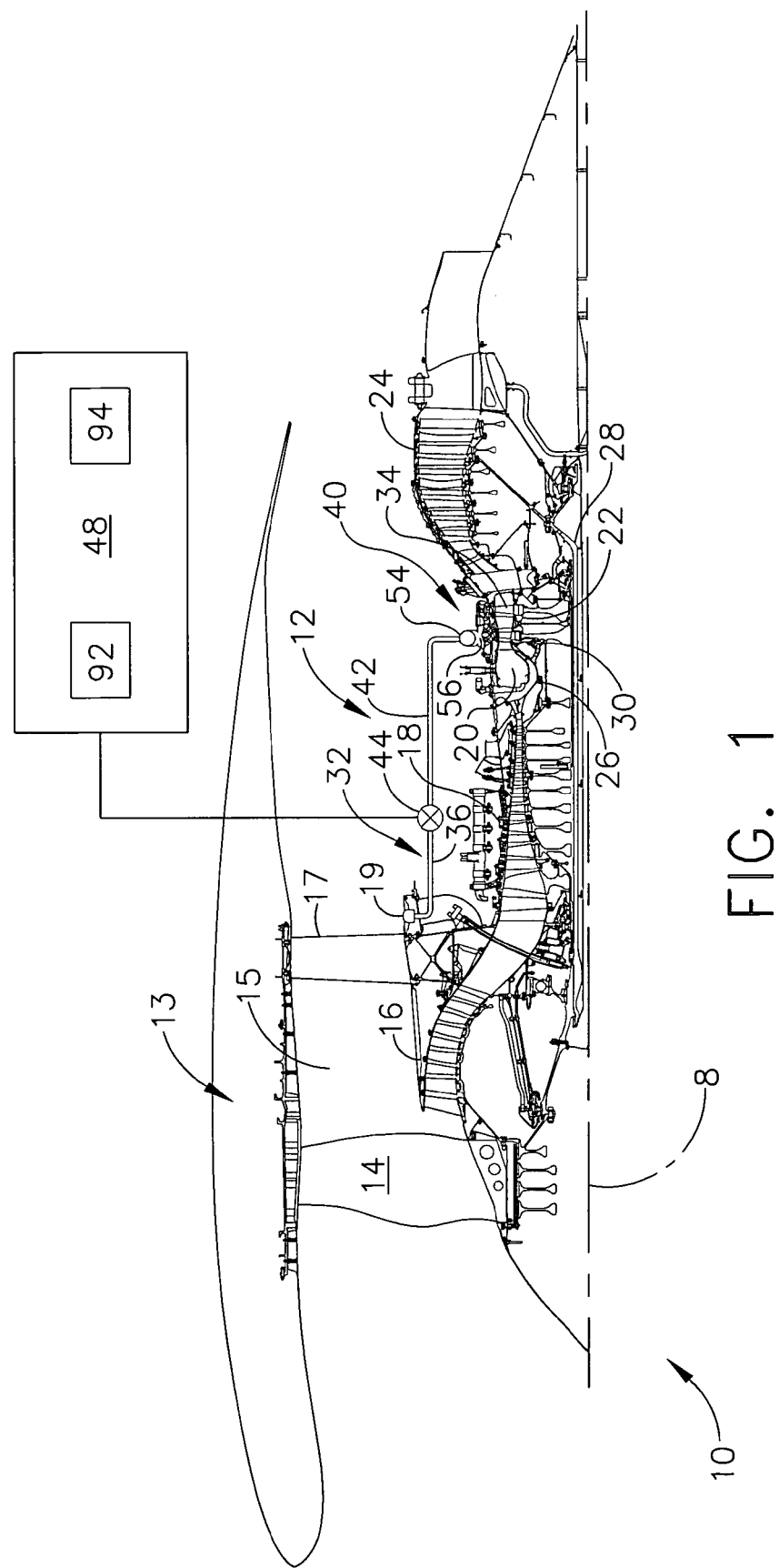
FIG. 1 is a schematical cross-sectional view illustration of an aircraft gas turbine engine active clearance control system employing a method for blade tip clearance deterioration compensation based on moving averages of engine performance parameters.

Schematically illustrated in cross-section in FIG. 1 is an exemplary embodiment of an aircraft gas turbine engine 10 including an active clearance control system 12. The active clearance control system 12 includes a method for compensating blade tip clearance deterioration DT, illustrated as a function of engine cycles in FIG. 9, based on one or more moving averages MAVG of a function F or functions of engine performance parameters P. The engine 10 has, in serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26, disposed about an engine centerline 8, drivingly connects the HPT 22 to the HPC 18 and a low pressure shaft 28 drivingly connects the LPT 24 to the LPC 16 and the fan 14. The HPT 22 includes an HPT rotor 30 having turbine blades 34 mounted at a periphery of the rotor 30.

Figure 2:
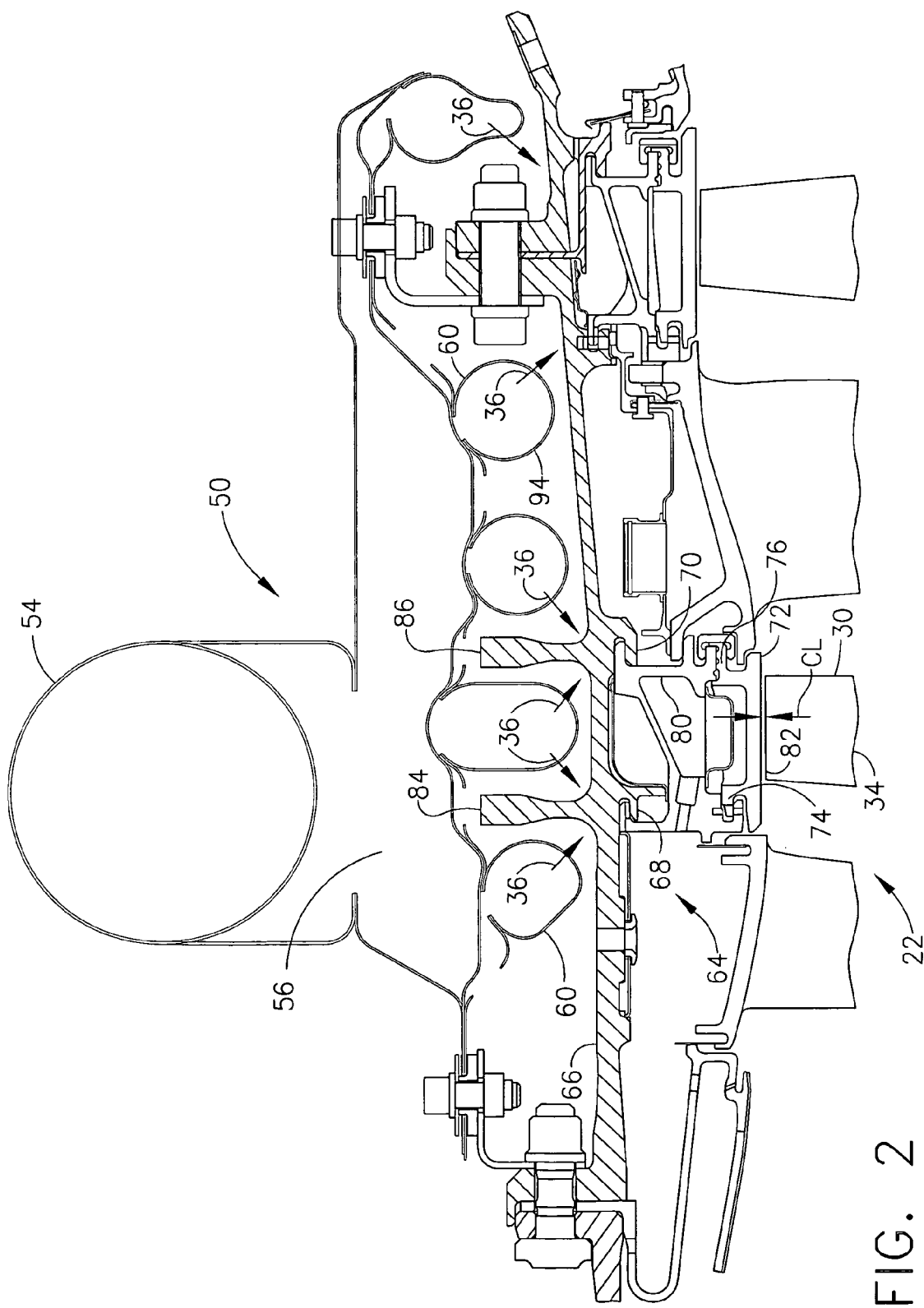
FIG. 2 is a cross-sectional view illustration of a blade clearance control apparatus used in the active clearance control system illustrated in FIG. 1.
Figure 8:
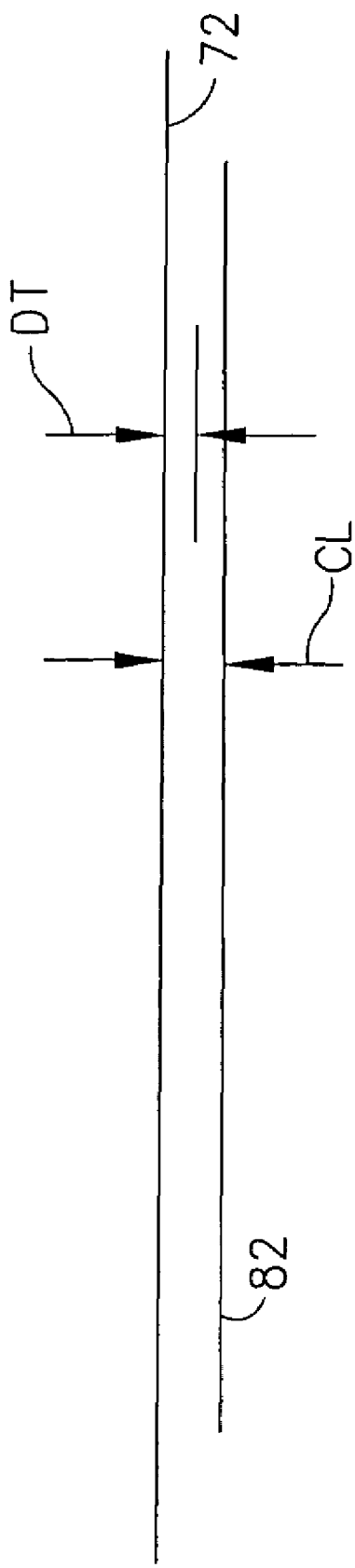
FIG. 8 is an enlarged cross-sectional view illustration of blade tip clearance and deterioration illustrated in FIG. 2.

Illustrated in FIG. 2 is a stator assembly 64 attached to a radially outer casing 66 of the HPT 22 by forward and aft case hooks 68 and 70. The stator assembly 64 includes an annular segmented stator shroud 72 mounted by forward and aft shroud hooks 74 and 76 to an annular segmented shroud support 80. The shroud 72 circumscribes turbine blades 34 of the rotor 30 and helps reduce the flow from leaking around radially outer blade tips 82 of the blades 34. The active clearance control system 12 is used to minimize a radial blade tip clearance CL between the blade tip 82 and the shroud 72, particularly during cruise operation of the engine 10 as illustrated in FIG. 8.

It is well known in the industry that small turbine blade tip clearances CL provide lower operational specific fuel consumption (SFC) and, thus, large fuel savings. In order to more effectively control blade tip clearance CL with a minimal amount of time lag and thermal control (cooling or heating depending on operating conditions) air flow, forward and aft thermal control rings 84 and 86 are provided. Forward and aft thermal control rings 84 and 86 are associated with the outer casing 66 and may be integral with the respective casing (as illustrated in FIG. 2), bolted to or otherwise fastened to the casing, or mechanically isolated from but in sealing engagement with the casing. The thermal control rings provide thermal control mass to more effectively move the stator shroud 72 radially inwardly (and outwardly if so designed) to adjust the blade tip clearances CL. The spray tubes 60 impinge thermal control air 36 (cooling air) on the forward and aft thermal control rings 84 and 86 and if so desired on the outer casing 66 to cause the stator shroud 72 to move radially inwardly to tighten up or minimize the blade tip clearances CL.

Referring to FIGS. 1 and 2, a compressed fan air supply 32 may be used as a source for thermal control air 36 which is supplied to a turbine blade tip clearance control apparatus generally shown at 40 through an axial air supply tube 42. An air supply inlet 19 to the axial air supply tube 42 is located downstream of exit guide vanes 17 disposed in the fan bypass duct 15 downstream of the fan 14. An air valve 44 disposed in the air supply tube 42 controls the total amount of thermal control air 36 flowed therethrough. The thermal control air 36 is cooling air in the exemplary embodiment of the active clearance control system 12 illustrated herein. The cooling air is controllably flowed from a fan bypass duct 15 surrounding the booster or low pressure compressor (LPC) 16 through the axial air supply tube 42 to a distribution manifold 50 of the turbine blade clearance control apparatus 40.

The air valve 44 and the amount of thermal control air 36 impinged for controlling turbine blade tip clearances CL (illustrated in FIG. 2) is controlled by the controller 48. The controller 48 is a digital electronic engine control system often referred to as a Full Authority Digital Electronic Control (FADEC) and controls the amount and temperature if so desired of the thermal control air 36 impinged on forward and aft thermal control rings 84 and 86 and, thus, to control the turbine blade tip clearance CL. The manifold 50 includes an annular header tube 54 which distributes the cooling air to a plurality of plenums 56 which in turn distributes the cooling air to a plurality of spray tubes 60 as illustrated in FIG. 2.

Figure 9:
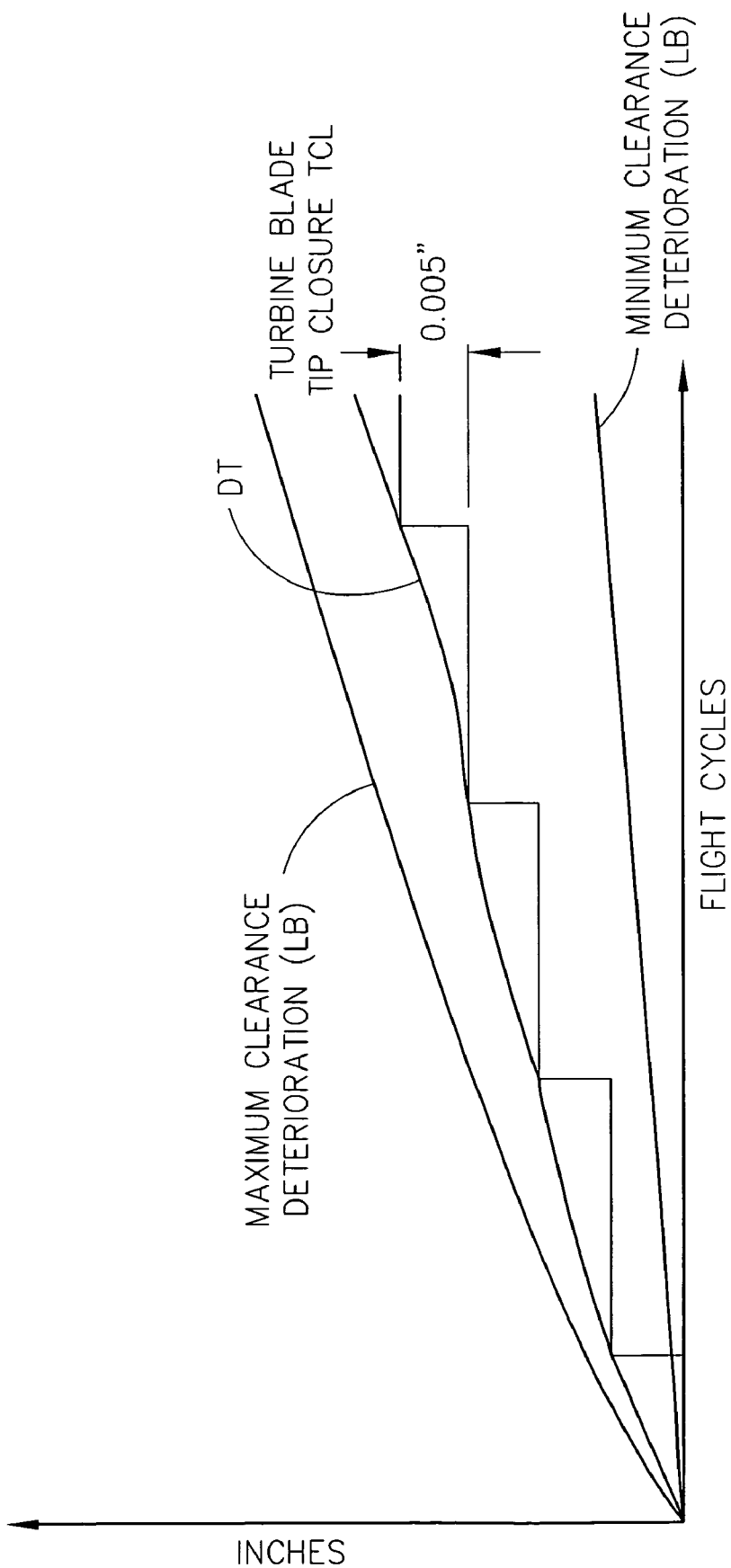
FIG. 9 is a graph illustrating predetermined or calculated upper and lower bounds of the blade tip deterioration term used in the Active Clearance Control Flow Model illustrated in FIG. 8.

An algorithm or mathematical computational active clearance control flow model hereinafter referred to as ACC flow model 92 is used to control the turbine blade tip clearance CL and is stored and run in the controller 48. The ACC flow model 92 is based on engine operating parameters and physical properties of various parts of the engine. The controller 48 sends a valve position signal to the air valve 44 based on the computational ACC flow model 92 to control the total amount of thermal control air 36. The air valve 44 is opened in increments according to the valve position signal. The ACC flow model 92 is at least partially based on a calculated amount of blade tip deterioration DT. The radial blade tip clearance CL includes an increasing amount of the blade tip deterioration DT as the engine is used over an increasing amount of time and cycles as illustrated in FIG. 9. In the exemplary embodiment illustrated herein, the ACC flow model 92 includes an added deterioration term to take into account the amount of blade tip clearance deterioration DT. A clearance model program CLM to determine the amount of blade tip deterioration DT is run in the FADEC as part of the ACC flow model 92. As illustrated in the flow chart of FIG. 3, the clearance model program CLM runs in background in FADEC after the engine is started.

Figure 4:
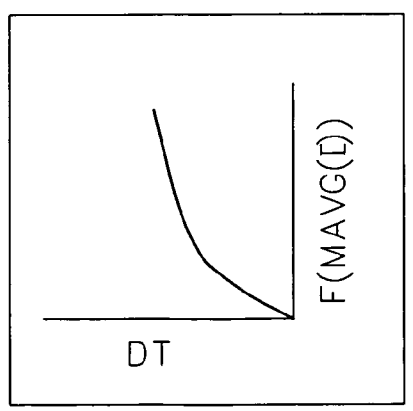
FIG. 4 is a chart generally illustrating a relationship between the blade tip clearance deterioration and a function of a moving average of an engine operating parameter.

The calculated turbine blade tip clearance deterioration DT is countered by a turbine blade tip closure TCL. The calculated turbine blade tip clearance deterioration DT is based on one or more moving averages MAVG(I) of one or more engine operating parameters P(I) respectively as illustrated in FIG. 4 by a graph of DT vs. a function F of MAVG(I) denoted as F(MAVG(I)). I represents an engine operating parameters index for the number of different engine operating parameters P being used e.g. if 5 different engine operating parameters are being used then I=1 through 5.

Figure 3:
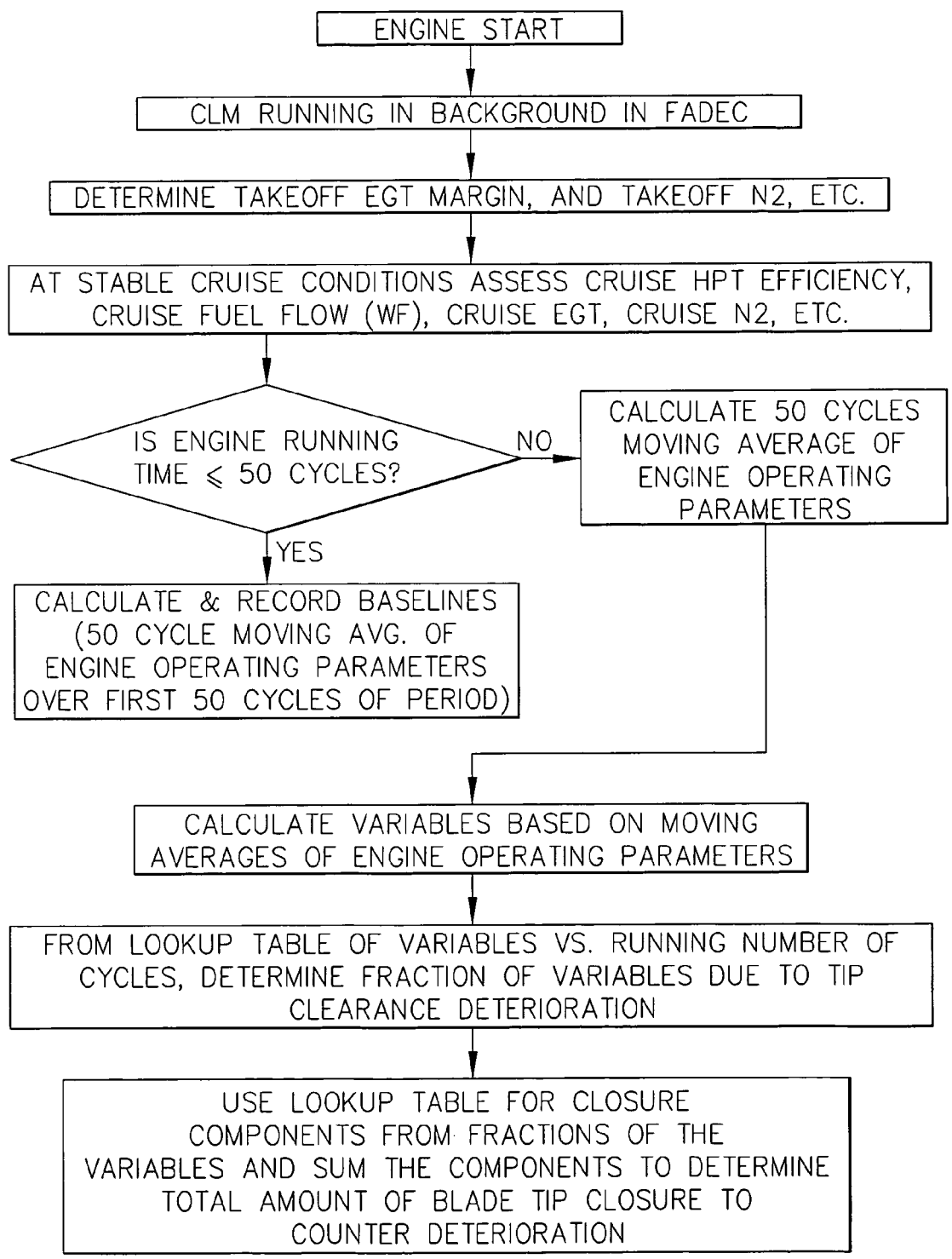
FIG. 3 is a flowchart illustrating a method for determining blade tip deterioration DT for the blade tip clearance deterioration compensation method used in the active clearance control system illustrated in FIG. 1.

The turbine blade tip closure TCL and the calculated turbine blade tip clearance deterioration DT may be based on or one or more functions F(I) of one or more moving averages MAVG(I) of the one or more engine operating parameters P(I) respectively. The moving averages are averaged over a period which is a fixed number of operational engine flight cycles NC. The exemplary method presented herein uses a 50 engine cycle period as is illustrated in FIG. 3. The flow rate of thermal control air 36 is adjusted to effect the turbine blade tip closure TCL to counter the blade tip clearance deterioration DT. The tip clearance deterioration DT is determined by a Clearance Deterioration Compensation Model 94 stored and run in the controller 48 as indicated in FIG. 1.

The engine operating parameters may include running number of engine cycles, takeoff and cruise exhaust gas temperatures EGT, a cruise turbine efficiency, takeoff and cruise maximum turbine speeds N, a cruise fuel flow as well as others. The method may use differences D between moving the averages MAVG of the one or more engine operating parameters P and respective baselines B of the one or more engine operating parameters. The baselines B may be chosen from a pre-existing value based on empiracle, semi-empiracle, or analytical techniques or based on measured or determined values during the engine's operation as in the method illustrated herein. Moving averages are illustrated herein as being averaged over a first 50 engine cycles period. The baselines herein are also moving averages that are averaged over the first 50 engine cycles period as illustrated in FIG. 3.

Figure 5:
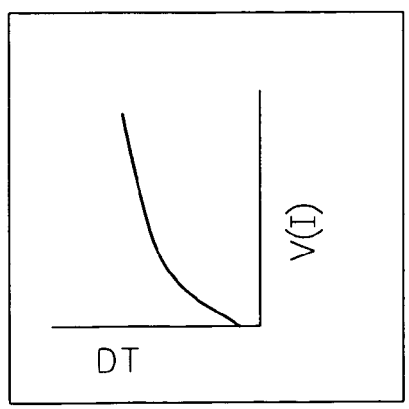
FIG. 5 is a chart illustrating another exemplary relationship between the blade tip clearance deterioration and a second function of a moving average of an engine operating parameter.

The calculated tip clearance deterioration DT thus may be based on what is referred to herein as one or more variables V which include the one or more moving averages of the one or more engine operating parameters P and/or the differences D between moving averages MAVG of the one or more of the engine operating parameters P and the respective baselines B of the one or more engine operating parameters or a combination of the two. V(I) may be an engine operating parameter P(I) such as the total number of engine cycles. Thus (V(I)=D(I) or MAV(I) or P(I) for I=1 through N where N is the number of engine parameters P being used in the method to determine the calculated tip clearance deterioration DT as illustrated in FIG. 5. If one V(I) is a P(I) such as the engine cycle then at least one other V(I) based on the one or more moving averages MAVG or the difference D between moving the averages MAVG and the respective baselines B of the one or more of the engine operating parameters P is used.

The exemplary method for calculating the blade tip clearance deterioration DT illustrated herein uses a calculated composite turbine blade tip clearance deterioration DTC model stored and operated in the FADEC. A clearance model program CLM to determine the amount of blade tip deterioration DT, exemplified by the calculated composite turbine blade tip clearance deterioration DTC, is run in the FADEC as part of the ACC flow model 92. The composite turbine blade tip clearance deterioration DTC is made up of component deteriorations DCL(I) wherein I represents different engine operating parameters illustrated as DCL(1) through DCL(7) in FIG. 7. The total or composite turbine blade tip clearance deterioration DTC is calculated first by determining all the component deteriorations DCL(I) and then by summing up all of the component deteriorations DCL(I). There is a different component deterioration DCL(I) for each of the one or more engine operating parameters P(I).

Figure 7:
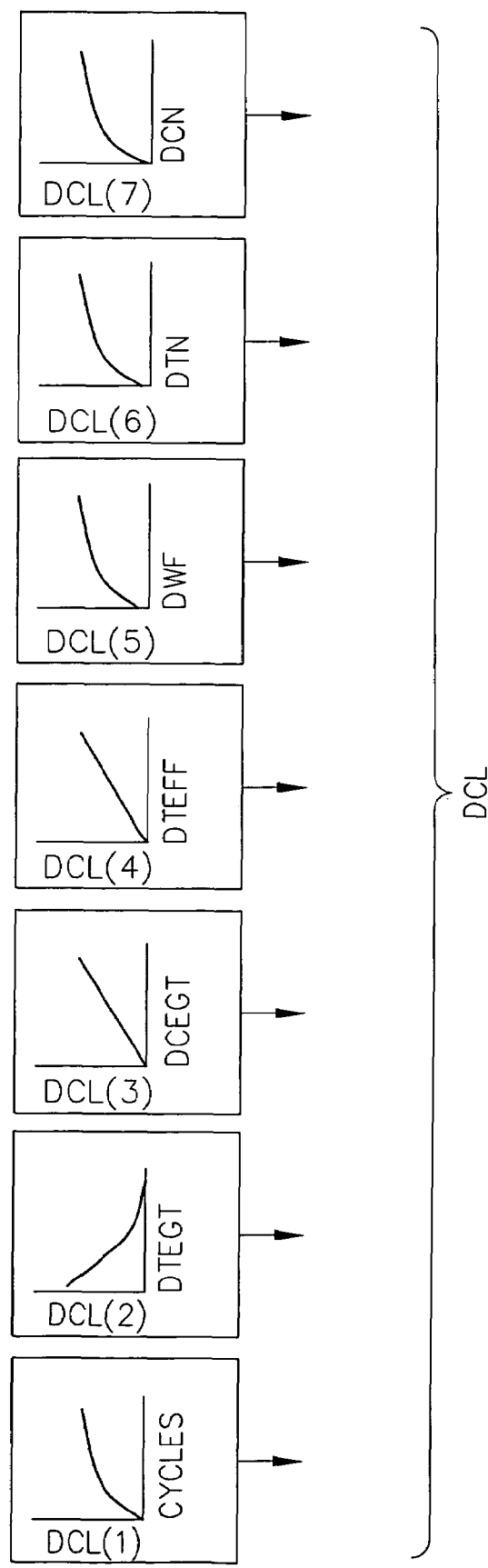
FIG. 7 is a set of charts illustrating exemplary relationships between exemplary components of the calculated blade tip clearance deterioration and the moving averages of exemplary engine operating parameters.

Illustrated in FIG. 7 are the several specific variables V of the moving averages of the one or more of the engine operating parameters P as well as cycles. One of the variables V is of the engine cycles, the rest of the variable V are of are the differences D between moving averages of the one or more of the engine operating parameters P and the respective baselines B of the one or more engine operating parameters. The differences D illustrated in FIG. 7 are between the moving averages and their respective baselines B for takeoff and cruise exhaust gas temperatures DTEGT and DCEGT, a cruise turbine efficiency DTEFF, takeoff and cruise maximum turbine speeds DTN and DCN, and cruise fuel flow DWF.

The component deteriorations DCL(I) are based on at least the one or more moving averages of one or more engine operating parameters P(I) respectively. The exemplary method illustrated herein shows that the component deteriorations DCL(I) are based on several variables V(I) which in turn are based on the moving averages of the one or more of the engine operating parameters P(I). One of the variables V(I) is a moving average of the engine cycles and the rest of the variables V(I) are the differences D(I) between moving averages of the one or more of the engine operating parameters P(I) and the respective baselines of the one or more engine operating parameters. The differences D(I) are between the baselines B(I) and the respective moving averages MAVG(I) of takeoff and cruise exhaust gas temperatures DTEGT and DCEGT, a cruise turbine efficiency DTEFF, takeoff and cruise maximum turbine speeds DTN and DCN, and cruise fuel flow DWF.

Figure 6:
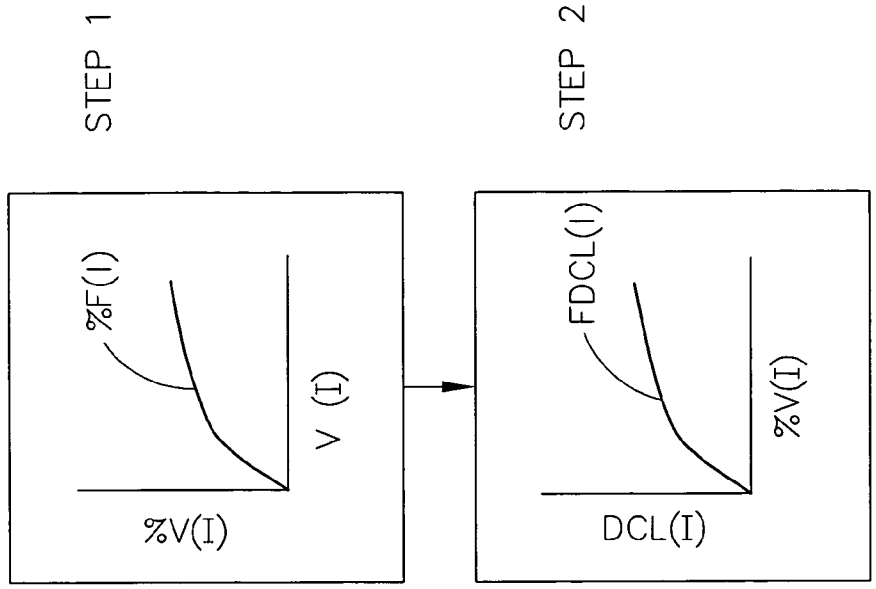
FIG. 6 is a two step flow chart illustrating an exemplary relationship between a component of the blade tip clearance deterioration and the second function of a moving average of an engine operating parameter illustrated in FIG. 4.

The exemplary method illustrated herein employs a two step process performed by the active clearance control flow model ACC flow model 92 stored in the FADEC to determine the component deteriorations DCL(I). The first step, illustrated as Step 1 in FIG. 6, is determining percentages %V(I) of the variables V(I) that are due to the radial blade tip clearance CL between the blade tips 82 and the shrouds 72. Percentage functions % F(I) stored as functions of the variables V(I) in the controller 48 or FADEC are used in determining the percentages % V(I). There are many methods known to store functions in the FADEC, the one illustrated herein is a table. A table lookup method or scheme is used to determine values of the percentage functions % F(I) based on the respective variables V(I). Table lookup methods usually store the values as a function of the variables and employ various interpolation schemes to determine the output value, e.g. % V(I), for a given input value, e.g. V(I).

The second step, illustrated as Step 2 in FIG. 6, is determining the component deteriorations DCL(I) which are stored as component deterioration functions FDCL(I) of percentages %V(I) that were determined in Step 1. The component deteriorations DCL(I) are stored in the controller 48 or FADEC. There are many methods known to store functions in the FADEC, the one illustrated herein is a table and a table lookup method or scheme is used to determine values of the component deteriorations DCL(I) based on the values of the percentage functions % V(I) for the respective variables V(I). Table lookup methods usually store the values as a function of the variables and employ various interpolation schemes to determine the output value, e.g. DCL(I), for a given input value, e.g. % V(I). The component deteriorations DCL(I) are then summed to calculate the composite turbine blade tip clearance deterioration DCL.

Confidence or weighing factors CF(I) may be applied to the component deteriorations DCL(I) before they are then summed to calculate the composite turbine blade tip clearance deterioration DCL. Using the confidence or weighing factors CF(I) for K number of the engine operating parameters P(I), the composite turbine blade tip clearance deterioration DCL=(CF(1)*DCL(1)+CF(2)*DCL(2)+. . . CF(K)*DCL(K))/(CF(1))+CF(2)+...CF(K)). The moving averages are averaged over a predetermined number of engine cycles NC or moving average period so that no changes are made to a turbine blade tip baseline clearance CLB until after at least the predetermined number of engine cycles NC. The turbine blade tip clearance baseline is an assembly nominal cold clearance typically based on part drawing dimensions.

Functions F(I), exemplified by F(1) through F(7) in FIG. 7, in the form of algorithms or tables from which the component blade tip clearance deteriorations DCL(I) are determined and stored in the controller 48. The engine operating parameters illustrated herein are high pressure turbine efficiency HPT- EFF, fuel flow WF, takeoff and cruise exhaust gas temperature EGT, takeoff and cruise maximum N2 (rotational speed of high pressure turbine) input to determine. Takeoff engine operating parameter values are measured and recorded during takeoff while cruise engine operating parameter values are recorded at stable cruise conditions for example at about 10 minutes after reaching cruise altitude during a flight cycle as indicated in FIG. 3.

The exemplary embodiment of the method illustrated herein opens the air valve 44 in increments according to the valve position signal such that the calculated turbine blade tip clearance deterioration DT is countered by incrementally increasing the turbine blade tip closure TCL which is illustrated herein as being in 0.005 inch increments as illustrated in FIG. 9. The air valve 44 is opened incrementally, thus, increasing the total amount of thermal control air 36 flowed incrementally and increasing the amount of the turbine blade tip closure TCL incrementally. An exemplary incremental amount of increase in the turbine blade tip closure TCL is illustrated herein as being 0.005 inches.

The exemplary embodiment of the method illustrated herein opens the air valve 44 only if the calculated turbine blade tip clearance deterioration DT is within predetermined or calculated upper and lower bounds UB and LB, respectively, which as in the exemplary embodiment illustrated herein may based on a running number of engine cycles as illustrated in FIG. 9.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A method to compensate for blade tip clearance deterioration between rotating blade tips and a surrounding shroud in an aircraft gas turbine engine, the method comprising:
    determining one or more variables based on at least one or more moving averages of one or more engine operating parameters respectively averaged over a fixed number of operational engine flight cycles,
    calculating a blade tip clearance deterioration based on the variables, and
    adjusting flow rate of thermal control air to counter the blade tip clearance deterioration based on the one or more variables.

2. A method as claimed in claim 1 further comprising the one or more engine operating parameters chosen from a group including running number of engine cycles, takeoff and cruise exhaust gas temperatures, a cruise turbine efficiency, takeoff and cruise maximum turbine speeds, and a cruise fuel flow.

3. A method as claimed in claim 2 further comprising determining an amount of blade tip closure to counter the blade tip clearance deterioration and adjusting the flow rate of thermal control air when the amount meets incremental criteria for adjusting the flow rate of thermal control air.

4. A method as claimed in claim 1 wherein the variables include differences between the one or more moving averages of the one or more engine operating parameters and one or more baselines of the one or more engine operating parameters respectively.

5. A method as claimed in claim 4 further comprising the one or more engine operating parameters chosen from a group including running number of engine cycles, takeoff and cruise exhaust gas temperatures, a cruise turbine efficiency, takeoff and cruise maximum turbine speeds, and a cruise fuel flow.

6. A method as claimed in claim 5 further comprising determining an amount of blade tip closure to counter the blade tip clearance deterioration and adjusting the flow rate of thermal control air when the amount meets incremental criteria for adjusting the flow rate of thermal control air.

7. A method as claimed in claim 4 further comprising calculating the blade tip clearance deterioration by calculating a composite turbine blade tip clearance deterioration including component deteriorations from corresponding ones of the variables and summing the components to determine the blade tip clearance deterioration.

8. A method as claimed in claim 7 further comprising determining an amount of blade tip closure to counter the blade tip clearance deterioration and adjusting the flow rate of thermal control air when the amount meets incremental criteria for adjusting the flow rate of thermal control air.

9. A method as claimed in claim 7 further comprising determining percentages of the variables that are due to a radial blade tip clearance between the blade tips and the shroud from percentage functions relating the percentages to the variables and then determining the component deteriorations from component deterioration functions relating the component deteriorations to the percentages.

10. A method as claimed in claim 9 further comprising the one or more engine operating parameters chosen from a group including running number of engine cycles, takeoff and cruise exhaust gas temperature margins, a cruise turbine efficiency, takeoff and cruise maximum turbine speeds, and a cruise fuel flow.

11. A method as claimed in claim 10 further comprising determining an amount of blade tip closure to counter the blade tip clearance deterioration and adjusting the flow rate of thermal control air when the amount meets incremental criteria for adjusting the flow rate of thermal control air and the blade tip clearance deterioration is within predetermined or calculated upper and lower bounds based on a running number of engine cycles.

12. A method as claimed in claim 1 wherein the variables include a combination of differences between a first portion of the one or more moving averages and corresponding baselines of the first portion of the one or more engine operating parameters respectively and a second portion of the one or more moving averages respectively.

13. A method as claimed in claim 12 further comprising the one or more engine operating parameters chosen from a group including running number of engine cycles, takeoff and cruise exhaust gas temperature margins, a cruise turbine efficiency, takeoff and cruise maximum turbine speeds, and a cruise fuel flow.

14. A method as claimed in claim 13 further comprising determining an amount of blade tip closure to counter the blade tip clearance deterioration based on the variables and adjusting the flow rate of thermal control air when the amount meets incremental criteria for adjusting the flow rate of thermal control air.

15. A method as claimed in claim 12 further comprising calculating the blade tip clearance deterioration by calculating a composite turbine blade tip clearance deterioration including component deteriorations from corresponding ones of the variables and summing the components to determine the blade tip clearance deterioration.

16. A method as claimed in claim 15 further comprising determining percentages of the variables that are due to a radial blade tip clearance between the blade tips and the shroud from percentage functions relating the percentages to the variables and then determining the component deteriorations from component deterioration functions relating the component deteriorations to the percentages.

17. A method as claimed in claim 16 further comprising the one or more engine operating parameters chosen from a group including running number of engine cycles, takeoff and cruise exhaust gas temperature margins, a cruise turbine efficiency, takeoff and cruise maximum turbine speeds, and a cruise fuel flow.

18. A method as claimed in claim 17 further comprising determining an amount of blade tip closure to counter the blade tip clearance deterioration and adjusting the flow rate of thermal control air when the amount meets incremental criteria for adjusting the flow rate of thermal control air and the blade tip clearance deterioration is within predetermined or calculated upper and lower bounds based on a running number of engine cycles.

* * * * *